United States Patent [19]

Tsutsumi

[11] Patent Number: 4,687,613
[45] Date of Patent: Aug. 18, 1987

[54] INJECTION MOLDING PROCESS FOR SYNTHETIC RESIN AND ITS APPARATUS

[76] Inventor: Shigeru Tsutsumi, 1165 Toyama-machi; Yonezawa-shi, Yamagata-ken, Japan

[21] Appl. No.: 747,695

[22] Filed: Jun. 24, 1985

Related U.S. Application Data

[63] Continuation of Ser. No. 437,106, Oct. 27, 1982, abandoned.

[30] Foreign Application Priority Data

Oct. 30, 1981 [JP] Japan .................. 56-172773

[51] Int. Cl.$^4$ ............ B29C 45/20; B29C 45/72
[52] U.S. Cl. .................. 264/328.15; 425/547; 425/549; 425/562; 425/570; 425/572; 425/580
[58] Field of Search .............. 425/547, 549, 564, 562, 425/565, 570, 566, 572, 580; 264/328.14, 328.15

[56] References Cited

U.S. PATENT DOCUMENTS

| | | | |
|---|---|---|---|
| 2,271,063 | 1/1942 | de Mattia | 264/328.15 |
| 2,296,295 | 9/1942 | Shaw | 264/328.15 |
| 2,296,296 | 9/1942 | Shaw | 264/328.15 |
| 2,551,439 | 5/1951 | Kovacs | 264/328.15 |
| 3,194,868 | 7/1965 | Shaw | 425/549 |
| 3,800,027 | 3/1974 | Tsutsumi | 425/549 |
| 4,306,852 | 12/1981 | Mateev et al. | 425/549 |

FOREIGN PATENT DOCUMENTS

| | | | |
|---|---|---|---|
| 51-56869 | 5/1976 | Japan | 425/549 |
| 1132080 | 10/1968 | United Kingdom . | |
| 1382800 | 2/1975 | United Kingdom . | |

*Primary Examiner*—Jay H. Woo
*Assistant Examiner*—Timothy W. Heitbrink
*Attorney, Agent, or Firm*—Kramer, Brufsky & Cifelli

[57] ABSTRACT

This invention relates to an injection molding process for synthetic resin and its apparatus which enables the production of highly precise molded articles and a shortening of the molding time. More particularly, by actuating a forcible cooling means mounted in a mold part constituting a gate, the synthetic resin fused by local heating of the gate is cooled and solidified forcibly, thereby closing the gate. On the other hand, by stopping the forcible cooling means, the solidified resin in the gate is heated and fused by a heater mounted either inwardly of a runner or outwardly thereof.

2 Claims, 6 Drawing Figures

INJECTION MOLDING PROCESS FOR SYNTHETIC RESIN AND ITS APPARATUS

This application is a continuation of application Ser. No. 437,106 filed Oct. 27, 1982, now abandoned.

BACKGROUND OF THE INVENTION

This invention relates to an injection molding process for synthetic resin and its apparatus, wherein a gate communicating with a cavity is cooled forcibly to solidify the synthetic resin in the gate after each injection molding operation, thereby closing the gate.

Generally, synthetic resin injection molding machines of this sort are of a sprue runner type and a sprue runnerless type. The precision injection molding is mainly of the former type. However, the injection molding of this type is forced to consume sprue runners as scraps, so that it becomes a wasteful consumption of material and disadvantageous in view of the energy saving policy.

According to the sprue runnerless type injection molding, the exterior and interior of the runner are constantly heated by a heater in order to prevent the synthetic resin in the runner from cooling and solidifying. Therefore, it is avoided to consume the material wastefully. However, the inconvenience of it is that the synthetic resin in the gate communicating with the cavity is subject to a back pressure by a return movement of a plunger means for the injection molding, so that resin from the gate may flow back into the runner. Thus, the molding accuracy is bad and the molded articles may be deformed or not uniform in shape. On the other hand, to prevent this back flow, it is required to maintain the inner pressure of the cavity until the fused resin within the cavity is solidified. However, the inconvenience is that the molding time becomes prolonged.

For the purpose of eliminating such inconveniences of the conventional art, the present Applicant proposes novel injection molding methods and apparatuses particularly in Japanese Pat. Nos. 762148, 916450, 902601 the corresponding U.S. Pat. No. 3800027, etc. According to one aspect of the new techniques disclosed in the aforesaid patents, an intermittent heater is mounted in a gate, thereby the synthetic resin in the gate is fused by the intermittent heater and injected in the cavity. Due to stoppage of the heating operation, the fused resin in the gate is radiated and solidified, thereby the fused resin in the cavity is prevented from flowing back into the runner. Thus, a wasteful consumption of the material is avoided and a suitable mold operation is realized.

BRIEF SUMMARY OF THE INVENTION

It is a general object of this invention to provide an injection molding process for synthetic resin and its apparatus which enables the production of highly precise molded articles and shortens the molding time.

According to an outstanding aspect of this invention, by actuating a forcible cooling means mounted in a mold part constituting a gate, the synthetic resin fused by heating locally the gate is cooled and solidified forcibly, thereby closing the gate. On the other hand, by stopping the forcible cooling means, the solidified synthetic resin in the gate is heated and fused by a heater mounted either outwardly of a runner or inwardly thereof.

These and other objects and advantages of this invention will become apparent from the following description of examples with reference to the accompanying drawings.

PREFERRED EXAMPLES OF THE INVENTION

Figure 1:
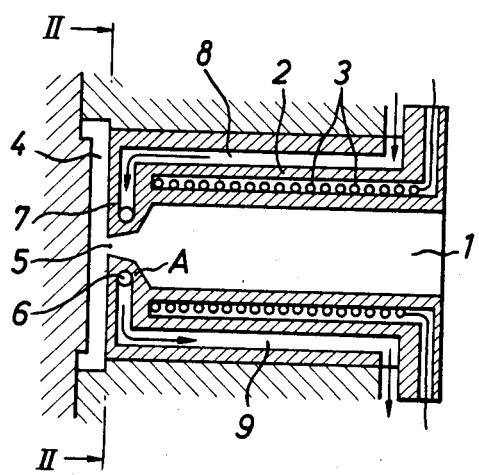
FIG. 1 is a vertical section view of a main part of an injection molding apparatus for synthetic resin according to this invention.
Figure 2:
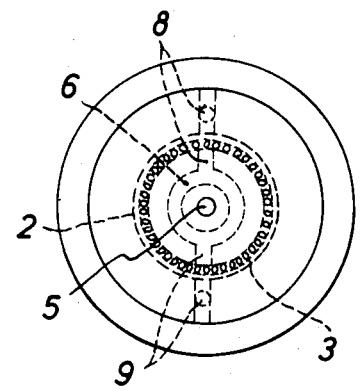
FIG. 2 is a front view taken on line II—II of FIG. 1.

A preferred example of this invention will now be described with reference to the accompanying drawings.

Numeral 1 is a runner formed in a cylinder 2 in which wall a heater 3 is incorporated. It is called a sprue runnerless type injection molding in which each molded article has no sprue runner.

Numeral 4 is a cavity and numeral 5 is a gate communicating with the runner 1. Numeral 6 is an annular cooling channel formed on an external periphery of a mold part 7. Numeral 8 is an inflow passage into which a cooling medium comes and the inflow passage 8 is communicated with the annular cooling channel 6. Numeral 9 is an outflow passage out of which the cooling medium goes, and the outflow passage 9 is communicated with the annular cooling channel 6. Preferably, the two passages 8 and 9 are opposed to each other and formed in parallel with each other in an axial direction of the runner 1. Symbol A is a forcible cooling means including the passages 8, 9. The two passages 8, 9 may be connected with each other by way of a pipe (not illustrated).

The operation of the apparatus according to this invention will now be described.

A certain quantity of fused synthetic resin is injected into the cavity 4 through the runner 1 and and the gate 5 by means of an injection molding means (not illustrated). The heater 3 constantly heats and fuses the synthetic resin in the runner 1 as well as in the gate 5, thereby the injection molding is operable. As soon as the fused resin is filled into the cavity 4 by completion of the injection molding operation, the forcible cooling means A is actuated. Next to this, when supplying a preferred cooling medium such as e.g. water, air or other fluid into the cooling channel 6 of the mold part 7 by means of a compression pump, a piston and other actuating means, the fused resin in the gate 5 is cooled rapidly, and solidified speedily, thereby the gate is closed. Further, during the time when the cooling fluid is supplied forcibly, it is of course possible to stop actuation of the heater 3.

Accordingly, since the solidified resin in the cavity 4 can be taken away immediately by a mold opening operation and the injection molding operation is returned back to the initial position, it is possible to shorten the molding time.

Further, the synthetic resin in the gate 5 at the time of the mold opening operation is solidified locally by means of the forcible cooling operation and the gate is closed, so that any fused resin never flows into the cavity.

Following this, when a mold clamping operation is initiated, the forcible cooling means A stops its cooling function, thereby the resin in the gate 5 is released from cooling. Namely, it is heated and fused immediately by the heater 3 and the fused resin in the runner 1, thereby the gate is opened.

Accordingly, by means of the aforesaid injection molding operation, the fused resin is filled into the cavity by way of the runner 1 and the gate 5, and the injection molding operation is completed.

Thus, by actuating again the forcible cooling means A, the fused resin in the gate 5 is solidified forcibly and the mold opening operation is carried out to take away the molded article.

By repeating the aforementioned operation, a preferred injection molding can be accomplished.

Figure 3:
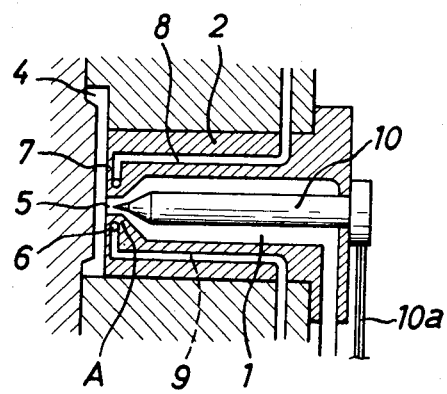
FIG. 3 is a vertical section view of another example of the injection molding appartus according to this invention.
Figure 4:
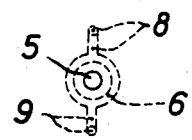
FIG. 4 is a front view of a gate of the example in FIG. 3 seen from a cavity side.

Another example of this invention will now be described with reference to FIGS. 3 and 4. According to this example, a projectile heating cylinder 10 whose one end is fixed with the cylinder 2 is mounted in the runner 1.

The projectile heating cylinder 10 is energized by a wire 10a incorporated therein, thereby the synthetic resin in the runner 1 and the gate 5 can be heated and fused so as to be injectable.

The forcible cooling means A is the same as that in the former example, so that its description will be omitted.

Accordingly, the resin in the gate 5 and the runner 1 is constantly heated by the projectile heating cylinder 10. Likewise in the former example, by actuating the forcible cooling means A, only the resin in the gate 5 can be cooled and solidified locally, and then the gate is closed. By repeating the aforementioned operation, the injection molding operation can be carried out.

Figure 5:
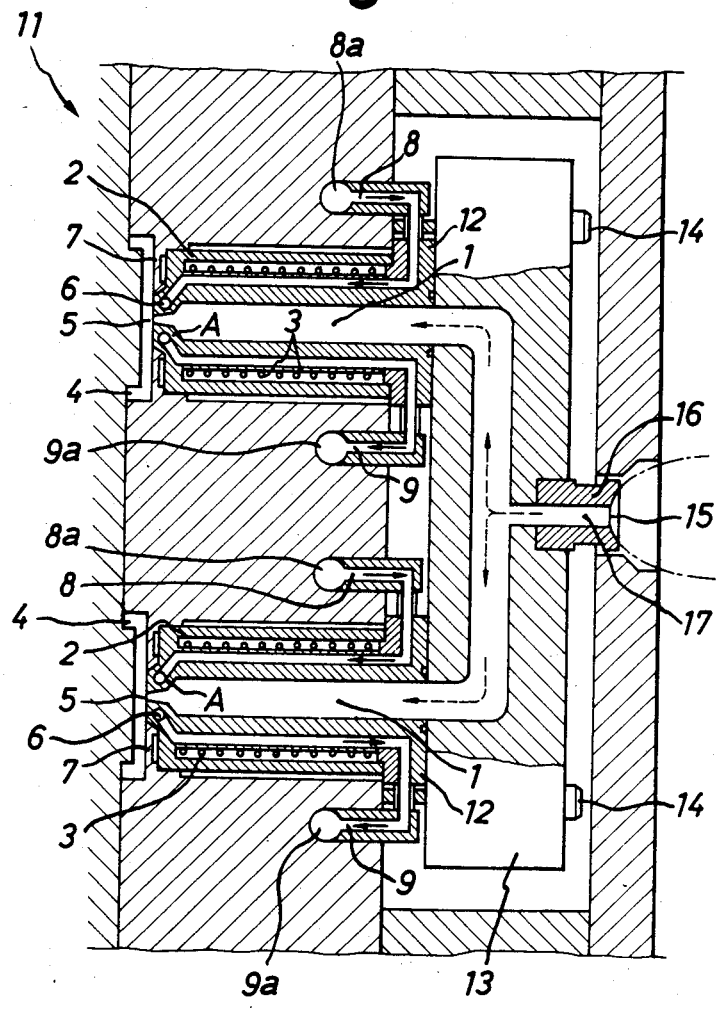
FIG. 5 is a vertical section view of a main part of another example.
Figure 6:
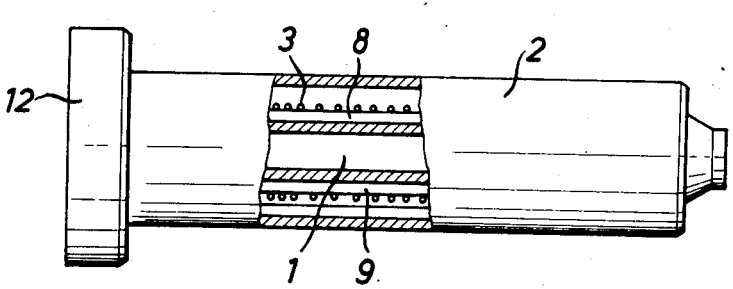
FIG. 6 is a partially cutaway side view of a single outer cylinder of the example in FIG. 5.

Another example of this invention will now be described with reference to FIGS. 5 and 6.

This example shows another injection molding apparatus for synthetic resin, wherein a plurality of molded articles can be obtained. Since the same components as shown in the previous examples have the same numerals, their description will be omitted.

Numeral 11 is a mold in which a preferred number of cavities 4 are formed. The cylinder 2 in which the runner 1, the gate 5, the forcible cooling means A, the heater 3, etc. are incorporated is produced independently of the mold 11, and mounted in each cavity. A flange 12 of each cylinder 2 is supported by one support plate 13 by means of screws 14.

In this example, the cooling medium inflow passage 8 and the cooling medium outflow passage 9 are mounted inside the cylinder 2 more closely to the runner 1, while the heater 3 is mounted outside the inflow passage 8 and the outflow passage 9. Of course, the heater 3 may be mounted inside the two passages 8 and 9 as shown in FIG. 1. Further, the heater 3 may be mounted within the runner 1 as shown in FIG. 3. Further, as shown in FIG. 3, the forcible cooling means A may be incorporated integrally in the mold 11 itself.

A pipe conduit (not illustrated) of the cooling medium may be connected to each forcible cooling means A through a switching electromagnetic valve by means of a compression pump or the like. An end of the pipe conduit is, by way of a variable throttle valve, connected to an end opening 8a of the inflow passage 8 formed in the mold 11, and another pipe conduit is connected to an end opening 9a of the outflow passage 9 to discharge the cooling medium. The variable throttle valve may alternatively be mounted in a position of the pipe conduit for the outflow passage, instead of in a position of the pipe condiut for the inflow passage. The switching electromagnetic valve mounted in the pipe conduit for the cooling medium is opened or closed by a timer which is interconnected with each injection cycle.

The support plate 13 is provided with a sprue bushing 16 having a contact face 15 for receiving an injection cylinder nozzle. The sprue bushing 16 is mounted in the best position of the support plate 13 so that the fused resin can be supplied uniformly into each cavity 4. A sprue 17 is formed through the sprue bushing 16 and communicates with the runner 1 and each gate 5.

The operation of this example will now be described.

When carrying out the injection molding operation by connecting the cylinder nozzle of the injection molding machine (not illustrated) to the sprue bushing 16, the fused resin is injected into each of a plurality of cavities 4 through the runner 1 and the gates 5. In that case, the resin in the runner 1 and the gates 5 is constantly heated and fused by the heater 3, thereby the injection molding operation is prepared.

As soon as the fused resin is filled in each cavity 4 by the injection molding operation, the electromagnetic valve of the cooling medium pipe conduit is opened and a desired quantity of the cooling medium is supplied into the cooling channel 6 of each mold part 7. Then, the fused resin in each ate 5 is cooled rapidly, and solidified speedily, thereby each gate 5 is closed.

Thus, the solidified resin in each cavity 4 can be taken away as a molded article by the mold opening operation. Then, the injection molding operation is returned back to the initial position. Since a plurality of cavities 4 are mounted, a plurality of molded articles are produced in each injection shot. This is suitable for mass production. Further, when the mold clamping operation is carried out, the electromagnetic valve is closed and the forcible cooling means A stops its actuation. Subsequently, the resin in the gate 5 is again heated speedily by the heater 3 and the fused resin in the runner 1, thereby the gate is opened. In this way the following injection shot is repeated.

It is to be understood that this invention is not limited to the aforementioned examples. For instance, the cooling channel 6 is not always limited to the annular shape. If it enables to cool locally the resin in the gate 5, any shape of it is available. Further, the structure of the forcible cooling means A is not limited to that in the aforesaid examples. Further, the kind of cooling medium which can be is not limited to those specified. Still further, the kind of driving device for actuating the forcible cooling means A specified can differ from that which is herein. Namely, a compression pump, a piston or the like is available if it enables interconnect ion with the injection molding operation.

According to one aspect of this invention, the synthetic resin in the runner is heated constantly inwardly of the runner or outwardly thereof by the heater, whereby the resin in the runner and the gate is placed under the fused condition. On the other hand, every time the injection molding operation is carried out, it is possible to cool only the gate area by means of the forcible cooling means and solidify the fused resin in the gate.

Thus, the gate is closed firmly. Accordingly, any resin filled in the cavity is not permitted to flow back into the runner in connection with the return of the plunger means for the injection operation, so that each of the molded articles is precise and uniform in shape. Further, it is possible to shorten the molding time. Further, since it is unnecessary to mount means for transforming the voltage of a power source of this injection molding apparatus, it is feasible to make the apparatus compact and produce it at a lower cost.

Still further, since it is optional to regulate a caliber of the gate, various molded articles including larger or smaller sizes can be produced.

Moreover, the present invention enables to produce highly precise molded articles.

What is claimed is:

1. A process for injection molding a fused synthetic resin into a cavity comprising the steps of:

heatng and fusing a synthetic resin from a runner and a gate, said runner and said gate communicating with each other;

injecting fused synthetic resin from said runner and gate into a cavity which communicates with said gate;

supplying a cooling medium as close to the external periphery of said gate as feasible by forcing said cooling medium into an annular channel directly adjacent to and surrounding said gate in a mold part which comprises said gate, instantaneously cooling and solidifying the fused synthetic resin within the gate to close the gate after the resin has been injected into the cavity; and stopping the supply of cooling medium to said channel at the completion of an injection molding cycle and opening the gate by letting said runner heat and fuse the solidified resin, so that a new cycle can be started.

2. An injection molding apparatus for synthetic resin comprising:

a pair of molds defining a mold cavity;

a gate communicating with the cavity;

a runner communicating with said gate;

heater means for continuously heating and fusing synthetic resin in the gate and the runner;

a mold part comprising said gate;

cooling means associated with said mold part comprising a coolant channel therein directly adjacent said gate for locally cooling said gate to a temperature sufficient to solidify synthetic resin in the gate; and means for actuating said cooling means every time an injection molding operation is carried out to close the gate by cooling and solidifying synthetic resin therein.

* * * * *